(12) United States Patent
Kaukler

(10) Patent No.: US 11,383,410 B1
(45) Date of Patent: Jul. 12, 2022

(54) METHODS OF CURING IONIC LIQUID EPOXY MIXTURES

(71) Applicant: William Felix Kaukler, Huntsville, AL (US)

(72) Inventor: William Felix Kaukler, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 16/990,703

(22) Filed: Aug. 11, 2020

Related U.S. Application Data

(60) Provisional application No. 62/886,640, filed on Aug. 14, 2019.

(51) Int. Cl.
| | | |
|---|---|---|
| *B29C 35/08* | (2006.01) | |
| *C08G 59/26* | (2006.01) | |
| *C08G 59/32* | (2006.01) | |
| *C08G 59/50* | (2006.01) | |
| *C09D 163/00* | (2006.01) | |
| *C09J 163/00* | (2006.01) | |

(52) U.S. Cl.
CPC .......... *B29C 35/0805* (2013.01); *C08G 59/26* (2013.01); *C08G 59/3245* (2013.01); *C08G 59/5033* (2013.01); *C09D 163/00* (2013.01); *C09J 163/00* (2013.01); *B29C 2035/0855* (2013.01); *C08G 2150/00* (2013.01); *C08G 2170/00* (2013.01); *C09J 2301/50* (2020.08)

(58) Field of Classification Search
CPC ........ B29C 35/0805; B29C 2035/0855; C08G 59/26; C08G 59/3245; C08G 59/5033; C08G 2150/00; C08G 2170/00; C09D 163/00; C09J 163/00; C09J 2301/50

USPC .......................................................... 522/65
See application file for complete search history.

(56) References Cited

U.S. PATENT DOCUMENTS

| | | |
|---|---|---|
| 8,193,280 B2 | 6/2012 | Paley et al. |
| 8,450,498 B2 | 5/2013 | Paley |

FOREIGN PATENT DOCUMENTS

| | | | | |
|---|---|---|---|---|
| CN | 106318302 A | * | 1/2017 | ............ C09J 11/04 |
| EP | 1172192 A2 | | 1/2002 | |

OTHER PUBLICATIONS

Huang et al., CN 106318302 A machine translation in English, Jan. 11, 2017 (Year: 2017).*

* cited by examiner

*Primary Examiner* — David T Karst
(74) *Attorney, Agent, or Firm* — Maynard Cooper & Gale, P.C.; Jon E. Holland

(57) ABSTRACT

The present disclosure is generally directed to a method of curing an ionic liquid epoxy mixture using an electromagnetic signal. First, an ionic liquid epoxy resin comprising ionic liquid epoxide monomers and, optionally, diluent epoxy resins and powdered fillers, is combined with a curing agent to form an ionic liquid epoxy mixture. The mixture is then applied as a coating onto a surface of a material. The coating is placed in contact with a second surface of the same material or a surface of another material. An electromagnetic signal, which in some instances is a microwave signal, is applied to the coating. Following application of the signal, the ionic liquid epoxide monomers polymerize and the mixture cures, adhering the surfaces together. Alternately, the epoxy mixture is applied to a surface and cured with microwaves to form a protective coating as in cladding or paint.

27 Claims, 5 Drawing Sheets

US 11,383,410 B1

METHODS OF CURING IONIC LIQUID EPOXY MIXTURES

RELATED APPLICATION

This application claims priority to U.S. Provisional Patent Application No. 62/886,640 filed on Aug. 14, 2019, titled "Microwave Curable Epoxy Adhesive," the entire contents of which are incorporated herein.

TECHNICAL FIELD

The present disclosure is directed to methods of curing ionic liquid epoxies using an electromagnetic signal.

RELATED ART

Ionic liquid epoxies contain ionic liquid epoxide monomer resins and may be cross-linked in the presence of a curing agent to form polymeric, cured epoxy resins. In comparison to common, commercial epoxies, ionic liquid epoxies have advantageous properties of high post-curing strength, no or negligible emission of volatile organic compounds (VOCs), stability at cryogenic temperatures, low permeability for moisture and oxygen, and low thermal expansion coefficients. These properties make ionic liquid epoxies particularly suitable for use in the extreme conditions of outer space, where hard vacuum, cryogenic temperatures, solar radiation, active oxygen, and other environmental factors must be accounted for. Reduction of VOCs is also desirable in household and industrial applications involving epoxies, as VOC odors are often unpleasant and chronic exposure to VOCs may result in harmful health, safety, and the environment outcomes. Exemplary ionic liquid epoxies are described in U.S. Pat. No. 8,193,280 B2 issued on Jun. 5, 2012 and in U.S. Pat. No. 8,450,498 B2 issued on May 28, 2013, which are both incorporated herein by reference.

Curing of epoxies generally improves the mechanical and thermal resistance properties of uncured epoxy solutions, allowing the epoxies to become more suitable for use in applications as adhesives, coatings, and composite materials. The process of curing often involves the addition of a curing agent or hardener and the application of heat, such that the curing process may occur over reasonably short periods of time. A curing agent functions to react with epoxide groups of the monomer resins and allows the cross linking of the epoxide monomer resins to form a polymeric epoxy. Though some epoxies may cure at room temperature in the presence of certain curing agents, these reactions may occur over extended periods of time and may result in incomplete curing that affects the mechanical and thermal properties of the product. Thus, heating of epoxies is generally undertaken to provide efficient and complete cross linking of the monomeric resins. Heat, however, needs to be applied to the epoxy adhesive or coating, but not in such a manner that the substrate materials conduct curing heat away from the epoxy, allowing it to reach an appropriate temperature for curing.

Differences in the properties of ionic liquid epoxies in comparison to common epoxies present an opportunity for improved alternative heating methods. These methods may result in the curing of ionic liquid epoxies without requiring the heating of substrate materials to the temperature of the epoxy, saving time and heating-related expenses and allowing curing to occur in unique environments.

The ionic liquid component of ionic liquid epoxies is essentially a salt in a liquid state and is composed of ions. Upon application of an electromagnetic signal, such as a radio frequency signal or, more specifically, a microwave signal, the oscillating electric field mobilizes polarized molecules of the ionic liquid epoxy, generating heat. The heating allows cross linking of ionic liquid epoxide monomers and curing agent molecules, curing the epoxy without requiring the heating of surrounding materials i.e. the objects being joined. This curing method may be particularly effective when coated materials are dielectric materials that are poor conductors of electric current. In the instance when a dielectric material is coated with an ionic liquid epoxide, applied electromagnetic signal will not be absorbed by the dielectric material and will instead serve to only heat the ionic liquid epoxy, allowing the epoxy to cure efficiently. It is also known that chemical reactions such a cement curing and sintering of ceramics are enhanced by the use of microwave energy. Polar or ionic molecules achieve a higher mobility or diffusion rates in a microwave field and this action accelerates the cure of the ionic liquid epoxy in addition to the simple heating effect of the microwave energy absorption. It is not known at this time what the degree of acceleration is by this mechanism for ionic liquid cure but curing of cement and sintering rates are 5× to 20× accelerated.

The present disclosure generally relates to methods of curing ionic liquid epoxy mixtures using an electromagnetic signal. These methods may specifically heat the ionic liquid epoxy mixtures without directly heating surroundings such as the fixturing or tooling materials, causing the ionic liquid epoxy to cure quickly, with less energy, and, optionally, with no or negligible off-gassing, relative to the curing of standard commercial epoxies.

SUMMARY OF THE DISCLOSURE

The present disclosure is directed to methods of curing ionic liquid epoxies. In one aspect of the disclosure, there is provided a method of curing an ionic liquid epoxy mixture. The method includes the steps of first providing an ionic liquid epoxy resin with ionic liquid epoxide monomers and combining the ionic liquid epoxy resin with a curing agent to form the ionic liquid epoxy mixture. This ionic liquid epoxy mixture is coated onto a first surface of a first material, which is placed in contact with a second surface. An electromagnetic signal is applied to the coating, such that the ionic liquid epoxide monomers polymerize and the ionic liquid epoxy mixture cures to become a cured epoxy. The cured epoxy thus adheres the first surface to the second surface.

In some embodiments, the ionic liquid epoxide monomers are 1,3-bis(glycidyl)imidazolium trifluoromethanesulfonimide. The ionic liquid epoxy resin further comprises diluent epoxy resins in some instances, and the diluent epoxy resins may be from the chemical family of Bisphenol-A diglycidyl ethers. In some instances, the ionic liquid epoxide monomers of the ionic liquid epoxy resin are diluted to as mush as 35% by weight with the diluent epoxy resins. In some embodiments, the curing agent is a diamine or a triamine compound, and more specifically 4,4'-(1,3-Phenylenedioxy) dianiline or m-xylylenediamine. In some embodiments, the ionic liquid epoxy resin and the curing agent are further combined with a filler to form the ionic liquid epoxy mixture, where the filler is a powdered glass, ceramic, or polymer filler in some instances. In some embodiments, the ionic liquid epoxy resin and the curing agent are further combined with an accelerator to form the ionic liquid epoxy mixture, where the accelerator is a thiol compound in some instances.

In some embodiments, the second surface is on the first material, while in other embodiments, the second surface is on a second material. The first material and the second material, when present may be dielectric materials. In some instances, the electromagnetic signal is a radio frequency (RF) signal that produces waves with frequencies ranging from 13 MHz to about 10 GHz. In some instances, the electromagnetic signal is a radio frequency (RF) signal that produces waves with frequencies of 980 MHz, 2.45 GHz, 5.8 GHz or 10 GHz. In some embodiments, the electromagnetic signal is a microwave signal that is applied in a microwave chamber. The microwave chamber is, in some instances, open to the environment, and beam microwaves are directed to the coating on the first material without exiting the microwave chamber. The microwave chamber is, in other instances, configured to enclose the first material, such that microwave signal is directed to an area within microwave chamber without exiting the microwave chamber. In some embodiments, a mobile signal generator and electromagnetic radiation source are used apply the electromagnetic signal. In some embodiments, volatile organic compounds (VOCs) are not emitted during the curing.

In another aspect of the disclosure, there is provided a method of curing an ionic liquid epoxy mixture. The method includes providing an ionic liquid epoxy resin with liquid epoxide monomers and combining the ionic liquid epoxy resin with a curing agent to form the ionic liquid epoxy mixture. A coating of the ionic liquid epoxy mixture is deposited onto a surface of a material. An electromagnetic signal is then applied to the coating, such that the ionic liquid epoxide monomers polymerize and the ionic liquid epoxy mixture cures to become a cured epoxy. The cured epoxy thus adheres to the surface as a protective coating.

In yet another aspect of the disclosure, there is provided a method of curing an ionic liquid epoxy mixture. The method includes providing an ionic liquid epoxy resin comprising 1,3-bis(glycidyl)imidazolium trifluoromethanesulfonimide and Bisphenol-A diglycidyl ether (Epon). The ionic liquid epoxy resin is combined with a curing agent to form the ionic liquid epoxy mixture, which is deposited as a coating onto a first surface of a first material. The coating is placed in contact with a second surface on a second material. A microwave signal is then applied to the coating, such that the ionic liquid epoxide monomers polymerize and the ionic liquid epoxy mixture cures to become a cured epoxy. The cured epoxy thus adheres the first surface to the second surface.

A further understanding of the nature and advantages of the present invention will be realized by reference to the remaining portions of the specification and the drawings.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
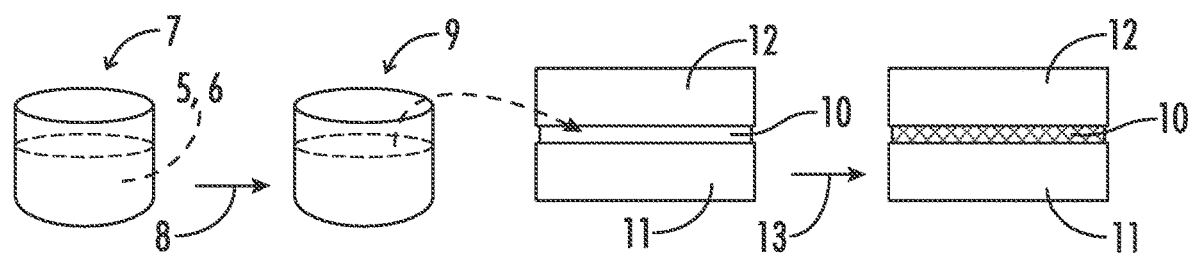
FIG. 1 is an illustration for an exemplary method for curing an ionic liquid epoxy resin using an electromagnetic signal.

The present disclosure is generally directed to methods of curing an ionic liquid epoxy using an electromagnetic signal. The curing occurs as electromagnetic energy heats ionic liquid epoxy through movement of charged molecules within ionic liquid epoxy. Through selection of an appropriate curing agent for use with the present methods, emission of volatile organic compounds (VOCs) may be prevented. The present methods are suitable for use in household and industrial applications, as well as applications in extreme environments, such as outer space.

An exemplary method may include the step of first providing an ionic liquid epoxy resin that includes ionic liquid epoxide monomers and, optionally, diluent epoxy resins. The ionic liquid epoxy resin may be combined with a curing agent to form an ionic liquid epoxy mixture. After depositing a coating of the ionic liquid epoxy mixture onto a surface of a first material, a second material may be placed in contact with the coating on the first material. The electromagnetic signal may then be applied to the coating, such that the ionic liquid epoxy increases temperature, polymerizes, and cures to become a cured epoxy. As the epoxy cures, chemical bonds may be formed, preventing the ionic behavior of the epoxy and affixing the first material to the second material.

In those instances where the electromagnetic signal is a microwave signal, methods of applying microwave energy may be undertaken in an industrial setting using a continuous conveyor belt microwave tunnel. In such a setting, an ionic liquid epoxy mixture adhesive including ionic liquid epoxide monomers, a curing agent, and, optionally, diluent epoxy resins would be strategically applied to materials to be joined. Coated materials may be placed onto a conveyor belt at a product inlet and transported to a microwave chamber, which may include a signal generator controlled by a user at an input interface. After the ionic liquid epoxy mixture is curing or has been cured, the materials may be transported out of the microwave chamber by the conveyor belt to a product outlet. In instances where the ionic liquid epoxy mixture has not been cured within the microwave chamber, it may be allowed to continue curing after removal from the microwave chamber.

A first material may be coated with an ionic liquid epoxy mixture, followed by the placement of a second material into contact with the uncured adhesive, such that the first material and the second material may be affixed to each other following the curing of the ionic liquid epoxy mixture. In other instances, a surface of a material may be coated with the ionic liquid epoxy mixture for use as a protective or anti-corrosion coating following the curing of the ionic liquid epoxy mixture.

As used herein, an "electromagnetic signal" produces waves with frequencies ranging from below 1 Hz to more than $10^{25}$ Hz. The electromagnetic spectrum includes radio waves, microwaves, infrared, visible light, ultraviolet, X-rays, and gamma rays.

As used herein, a "radio frequency (RF) signal" produces waves with frequencies ranging from about 3 kHz to 300 GHz and includes microwaves and radio waves. RF radiation is non-ionizing radiation that may cause atoms in molecules to move or vibrate, but does not ionize the molecules. Practical frequencies suitable for heating polymers such as epoxies range from 3 MHz to 100 GHz with preferred industrial values of 980 MHz, 2.45 GHz, 5.8 GHz and 10 GHz.

As used herein, a "dielectric material" generally refers to a material that does not conduct electric current or is a poor conductor of electric current. For example, materials such as wood, foam, plastics, glass, and cement may be considered dielectric materials.

Figure 2:
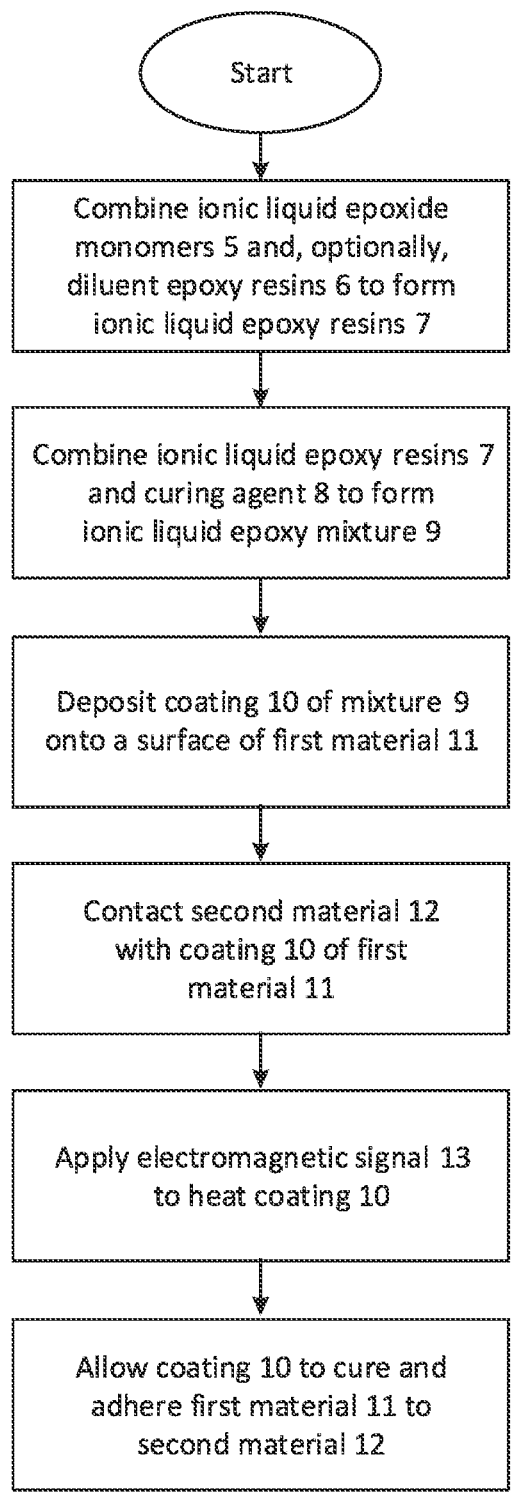
FIG. 2 is a flowchart describing an exemplary method for curing an ionic liquid epoxy resin depicted in FIG. 1.

Referring to FIGS. 1 and 2, one embodiment of a method for curing an ionic liquid epoxy resin 7 is described. Ionic liquid epoxy resin 7 includes a solution of ionic liquid epoxide monomers 5 and, optionally, diluent epoxy resins 6. Ionic liquid epoxide monomers 5 consist of charged ions and include an epoxide chemical group. The synthesis of an exemplary ionic liquid epoxide monomer compatible with the present methods, 1,3-bis(glycidyl)imidazolium trifluoromethanesulfonimide, is described in detail in U.S. Pat. No. 8,450,498 B2. Ionic liquid epoxy resin 7 has properties such as high post-curing strength, no or negligible emission of volatile organic compounds (VOCs), stability at cryogenic temperatures, low permeability for moisture and oxygen, and low thermal expansion coefficients. Such properties may be preserved in a diluted solution of ionic liquid epoxy resin 7, where diluent epoxy resins 6 are added to decrease production costs. For example, a dilution of 9.5% ionic liquid epoxide monomers 5 by weight with a common commercial epoxy, such as one from the chemical family of Bisphenol-A diglycidyl ethers (e.g., Epon), is compatible with the curing methods of the present disclosure. In another example, a dilution of up to 35% ionic liquid epoxide monomers 5 by weight with a common commercial epoxy, such as one from the chemical family of Bisphenol-A diglycidyl ethers (e.g., Epon), is compatible with the curing methods of the present disclosure. In some embodiments, dilution of ionic liquid epoxide monomers 5 with diluent epoxy resins 6 is undertaken to produce ionic liquid epoxy resin 7 with as low as approximately 9.5% ionic liquid epoxide monomers 5 by weight. In the instances where diluent epoxy resins 6 are used, these diluent epoxy resins 6 do not include ionic liquids and do not absorb electromagnetic energy. Instead, ionic liquid epoxide monomers 5 are relied upon in diluted solutions of ionic liquid epoxy resin 7 to generate heat by their rotation in response to an electromagnetic signal 13. Addition of diluent epoxy resins 6 may lead to VOC production and thus dilution may restrict applications in VOC-incompatible environments. In industrial applications, adequate ventilation may mitigate the effects of any released VOCs.

In a subsequent step illustrated in FIG. 1 and described in FIG. 2, ionic liquid epoxy resin 7 is combined with a curing agent 8 to form an ionic liquid epoxy mixture 9. Curing agent 8 aids in the cross linking and curing of ionic liquid epoxide monomers 5 and may optionally be selected to avoid the production of VOCs. Many curing agents 8 are compatible with the curing methods of the present disclosure, though preferred embodiments utilize curing agents 8 that are diamine or triamine compounds, or other suitable compounds that effectively bind and cross link ionic liquid epoxide monomers 5 without releasing VOCs. Exemplary curing agent 8 includes 4,4'-(1,3-Phenylenedioxy) dianiline, as described in detail in U.S. Pat. No. 8,193,280 B2, and m-xylylenediamine. Formulations of ionic liquid epoxy mixture 9 impact appropriate heating temperature and times for curing. For instance, formulations of ionic liquid epoxy mixture 9 where curing agent 8 is 4,4'-(1,3-Phenylenedioxy) dianiline require heating to approximately 100-200 degrees Celsius to cure to maximal strength. When curing agent 8 is m-xylylenediamine, ionic liquid epoxy mixture 9 curing at room temperature requires a range of about one hour to hundreds of hours, though increased temperature generally reduces curing times. For example, ionic liquid epoxy mixture 9 containing m-xylylenediamine as curing agent 8 cures after two minutes of 1300 W microwave-induced heating, followed by several minutes post-heating to complete the curing process. Curing agent 8 works in concert with heat to polymerize ionic liquid epoxide monomers 5 to cure ionic liquid epoxy mixture 9. Heat opens the epoxide ring structure of ionic liquid epoxide monomers 5, after which amine groups of curing agent 8 bond with the opened epoxide rings and cross link ionic liquid epoxide monomers 5 to form polymeric epoxies. The selection of curing agent 8 not only impacts emission of VOCs during the curing process, but also influences properties of a cured epoxy product, such as mechanical properties and color. For example, amine curing agents generally produce harder cured products where alternative curing agents may produce foam, a rubber-like product, or an elastomeric product with longer cure times.

In addition to curing agent 8, other additives such as accelerators or fillers may be combined with ionic liquid epoxy resin 7 to form ionic liquid epoxy mixture 9. Accelerators are used to decrease the cure time of ionic liquid epoxy resin 7, with common accelerators being thiol compounds. However, thiol-based accelerators produce odorous VOCs that may require ventilation or may prove inappropriate for applications in extreme or unventilated environments. Fillers are used to alter the viscosity of ionic liquid epoxy mixture 9 and decrease costs. For instance, addition of fillers may prevent ionic liquid epoxy mixture 9 from wicking into a porous support material, though incorporation of fillers may also alter the color of the cured product by scattering light and decreasing transparency. Methods of the present disclosure are compatible with formulations of ionic liquid epoxy mixture 9 that include up to 50% of powdered ceramic, glass, or polymer fillers.

Referring back to FIGS. 1 and 2, ionic liquid epoxy mixture 9 may be applied to a first material 11 as a protective surface layer or as a coating 10 to be adhered to a second material 12. Alternatively, ionic liquid epoxy mixture 9 may be applied to a first surface of first material 11 to be adhered to a second surface of first material 11. Though coating or adhering of one or two materials are described in detail in herein, the number of materials to be coated or adhered together with ionic liquid epoxy mixture 9 according to the disclosed methods may be greater than two. Many materials are suitable for use in accordance with the present methods, though dielectric materials have particularly advantageous properties. Exemplary dielectric materials include wood, foam, plastics, glass, and cement. Dielectric materials allow electromagnetic waves to pass through to coating 10, where they may be absorbed and generate heat within coating 10 due to molecular-level rotation of ionic liquid epoxy resin 7. Dielectric materials are generally poor thermal conductors, and thus do not conduct significant amounts of thermal energy away from a heated coating 10 as it cures. Conversely, bulk conductive materials, such as metals or carbon fiber, reflect electromagnetic energy and conduct thermal energy. In instances where metals are used as first material 11 or second material 12, electromagnetic signal 13 applied to coating 10 results in waves that are reflected, and therefore only one of first material 11 or second material 12 may be metal such that coating 10 absorbs energy from electromagnetic signal 13. Metal materials conduct heat away from coating 10, and may require longer heating periods for the curing of coating 10. Alternatively, metal materials may be pre-heated prior to application of electromagnetic signal 13 to reduce any additional heating time during the curing of coating 10. These considerations related to the curing of coating 10 on a metal material may reduce the energy and cost savings of the disclosed methods, however.

Application of electromagnetic signal 13, as shown as a step in the process of FIG. 2, produces an oscillating electric field that is not absorbed by dielectric materials but causes motion in the charged ionic liquid epoxy resin 7 of coating 10. Specifically, the oscillating electric field causes ions with the epoxy resin 7 to oscillate or otherwise move, and this motion generates heat and initiates the polymerization of ionic liquid epoxide monomers 5 in the presence of curing agent 8. Chemical bonds formed during polymerization lock ionic liquid epoxide monomers 5 into place such that the cured epoxy lacks ionic behavior and is unable to undergo further heating by electromagnetic signal 13. Electromagnetic signal 13 in some embodiments is RF signal or, more specifically, microwave signal. Many commercial microwaves generally operate at frequencies between about 2.4 and 2.48 GHz, though some industrial microwave generators operate at frequencies between about 980 and 1000 MHz. Both commercial household microwaves and industrial microwave generators are compatible with the methods of this disclosure. Additionally, ultra-high frequency signals of about 400 to about 900 MHz may be desirable and compatible with the present methods where a magnetron is not required. In one embodiment of the present method, electromagnetic signal 13 produces frequencies ranging from about 13 MHz to about 5.6 GHz. Microwave-induced heating according to the process described in FIG. 2 may occur over about 3-4 minutes, after which curing may occur in the microwave application location or after removal from the microwave source. The present methods utilize microwaves to raise the temperature of coating 10 to a temperature between approximately 100 and 200 degrees Celsius. However, ionic liquid epoxy resin 7 may cure over longer periods of time at lower temperatures and will cure at temperatures ranging from ambient room temperature to about 200 degrees Celsius. Notably, higher frequency radiation induces faster motion of ions in ionic liquid epoxy resin 7, which generates more heat over a particular time period. However, the curing epoxy may soften to have mechanical properties similar to those of a low glass transition plastic, such as polystyrene or vinyl, at particularly high temperatures.

Figure 3:
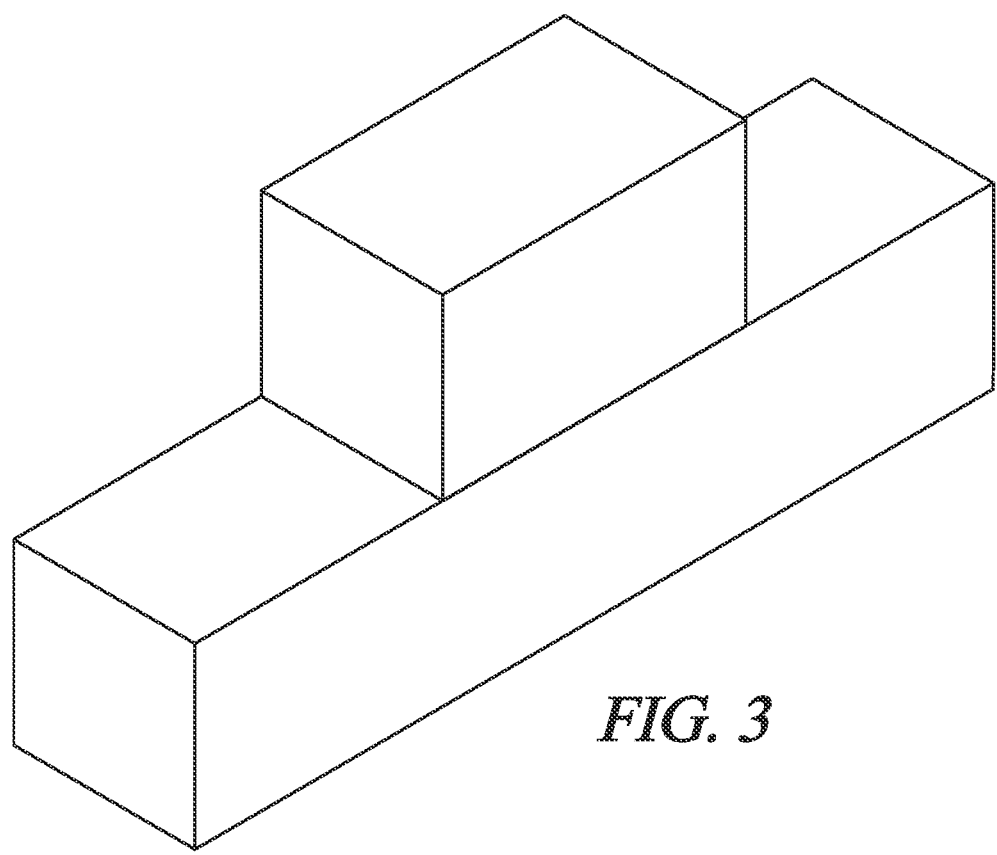
FIG. 3 depicts several exemplary materials adhered together by the method of FIG. 1.

Referring now to FIG. 3, first material 11 is affixed to second material 12 by the coating 10 of ionic liquid epoxy mixture 9 after it has been cured. Coating 10 is generally a thin bonding layer of ionic liquid epoxy mixture 9. In the instance where first material 11 or second material 12 is a thermally conductive material, the thin layer of coating 10 may experience conduction of thermal energy toward the conductive material during the curing process due to a high surface to volume ratio of coating 10. Larger volumes of coating 10 may reduce the time necessary for the temperature of coating 10 to become high enough for curing to occur, though larger volumes increase material costs.

In FIG. 3, materials are two glass microscope slides (left) and two blocks of polycarbonate (right), which were coated with 9.5% ionic liquid epoxy resin 7, diluent epoxy resins 6, and m-xylylenediamine as curing agent 8. Curing of the ionic liquid epoxy resin 7 on the materials occurs after about two minutes of 1300 W microwave-induced heating. Following microwave application, materials are not warm.

Figure 4:
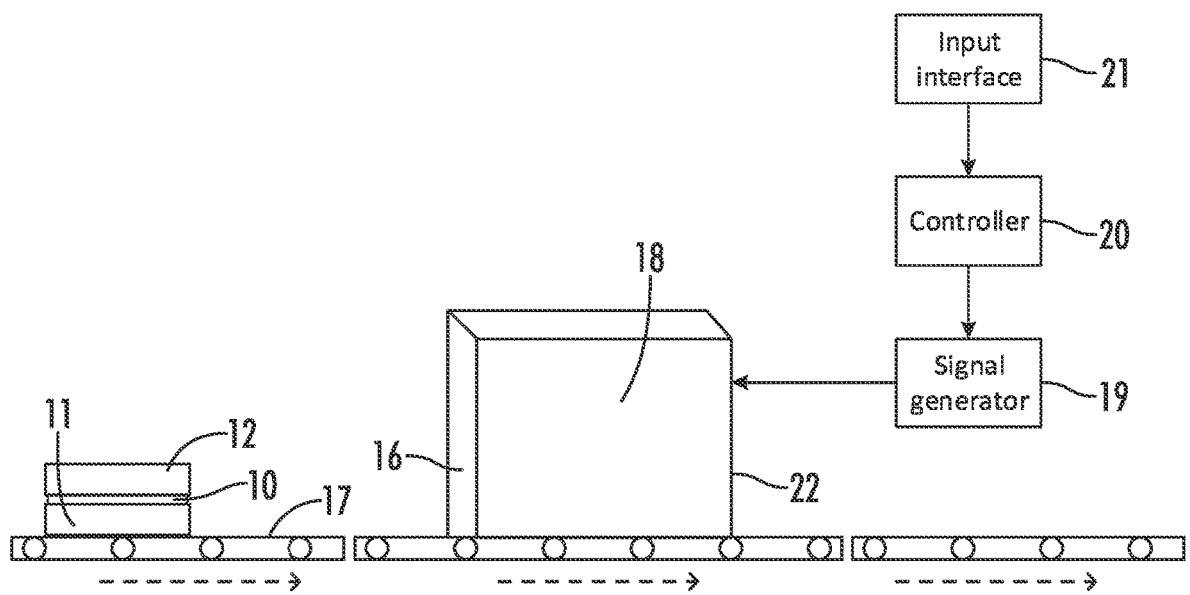
FIG. 4 is an illustration of an exemplary curing system capable of practicing the method of FIG. 1.

Referring to FIG. 4, the curing process may be undertaken not only in standard kitchen microwaves, but also would be compatible with industrial microwaves or other types of microwaves such as those from a semiconductor microwave generator or a gyrotron. The industrial microwaves include a conveyor belt 17 with one end serving as an uncured product inlet 16 and the other end as a curing/cured product outlet 22. The uncured product for placement on uncured product inlet 16 may be first material 11 with coating 10 to function as an anti-corrosion or protective layer, first material 11 with coating 10 in contact with second material 12 to function as an adhesive, or a first surface of first material 11 with coating 10 in contact with a second surface of first material 11 to function as an adhesive. Multiple materials may be coated for the forming of a protective layer or for adhesion upon curing. Conveyor belt 17 allows automated transport of uncured products into a microwave chamber 18, which may be sized to completely encompass uncured products or may be open to the immediate environment. In instances where microwave chamber 18 is open to the environment, microwaves are applied in a specific and controlled manner, such as through beam microwaves, so that microwaves are applied only to areas of interest within the uncured product. In an enclosed embodiment of microwave chamber 18, entrances and exits to microwave chamber 18 may be temporarily sealed with a sash, curtain, gate, or other suitable conductive or metal partition structure, such that microwaves are mainly limited to the area within microwave chamber 18.

A user controls microwave signals at an input interface 21 which, through a controller 20, directs the operation of a signal generator 19 connected to microwave chamber 18. Input interface 21 allows a user to input data, change system parameters, and otherwise view or operate the curing system by generating electromagnetic signal 13. Input interface 21 may comprise buttons, switches, interactive screens, and other such suitable components for data input, as well as screens, LEDs, and audio systems capable of visual or audio communication of system status and operation. Signals from input interface 21 may be communicated to controller 20, and controller 20 may output signal to display at input interface 21. Controller 20 may be implemented in hardware or a combination of hardware or software. As an example, the controller 20 may comprise a microprocessor or other instruction execution device, such as digital signal processor, programmed with software for performing the functions described herein for the controller 20. In this regard, the controller 20 may be configured to transmit a control signal to the signal generator 19 for selectively activating the signal generator 19 based on input received by the input interface 21. In other embodiments, the controller 20 may control the signal generator 19 according to other algorithms or based on other factors. When activated by the controller 20, the signal generator 19 generates electromagnetic signal 13, which may be an RF signal or a microwave signal. Generation of the electromagnetic signal 13 results in the production of electromagnetic radiation, such as microwaves, within microwave chamber 18. Communication between system components may include physical conduits, such as wires, fibers, or cables, may be wireless communication, or include any other suitable means of transmitting signal data between components, including input interface 21, controller 20, signal generator 19, and microwave chamber 18. Note that the signal generator 19 may be located within the chamber 18 or coupled to the chamber 18 such that the electromagnetic signal from the generator 19 propagates within the chamber 18, and the chamber walls may be designed to block the electromagnetic signal so that the signal radiation is substantially contained within the chamber 18, thereby limiting exposure of persons within the vicinity of the system to the signal radiation. In other embodiments, use of a chamber 18 or a conveyor is unnecessary.

Coupling of ionic liquid epoxy resin 7 to microwaves within microwave chamber 18 begins to cure ionic liquid epoxy resin 7 at temperatures ranging from about 100 to 200 degrees Celsius and enables the formation of a strong coating on a material or strong adhesive bonds between materials. Curing may continue as the material is transported by conveyor belt 17 through curing/cured product outlet 22. Curing outside microwave chamber 18 takes several minutes, after which curing is complete.

Figure 5:
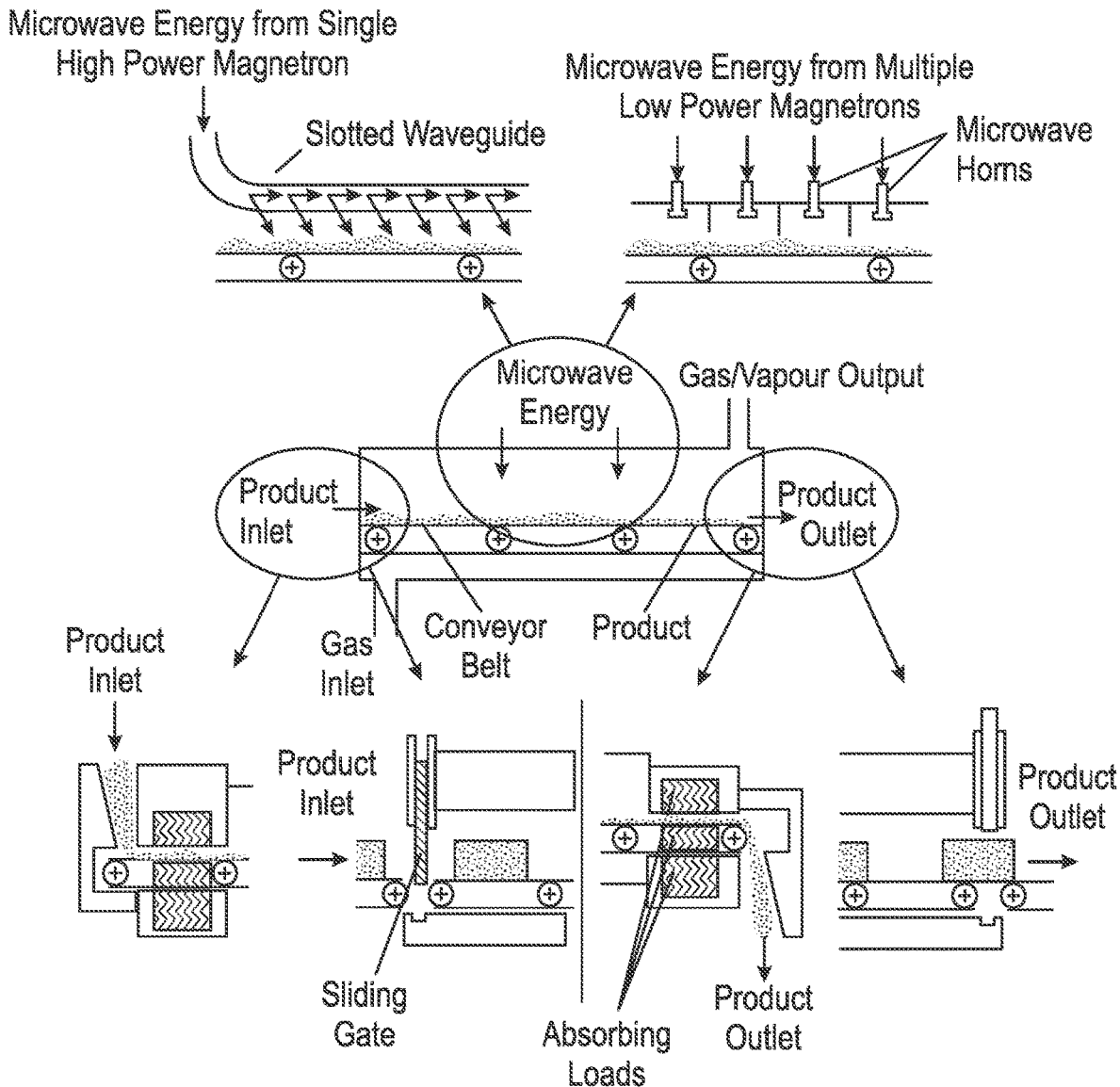
FIG. 5 is a schematic view of a prior art for a powdered processed material on a continuous conveyor belt microwave tunnel capable of being modified for practicing the method of FIG. 1.

FIG. 5 displays an exemplary prior art continuous conveyor belt industrial microwave (Richardson, P. (ed.), (2001) *Thermal Technologies in Food Processing* (p. 196). Cambridge, UK: Woodhead Publishing). This exemplary microwave may be powered by one or several magnetrons and transports products on a conveyor. Loose products may be administered and collected through chutes, while larger products may be transported by multiple conveyors.

In other embodiments of the method, a mobile signal generator and electromagnetic radiation source are used to heat and cure ionic liquid epoxy resin 7. In these instances, ultra-high frequency radiation with frequencies ranging from about 400 to about 900 MHz may be appropriate as it does not require a magnetron.

Microwave curing of ionic liquid epoxy resin 7 is considered a green process as only ionic liquid epoxy resin 7, and not surrounding materials, is heated. The selective application of electromagnetic signal 13 for curing reduces energy and costs. Additionally, ionic liquid epoxy resin 7 may be formulated to emit no or negligible VOCs, allowing an adhesive bondline or coating that is non-porous and stable. One characteristic of the ionic liquid epoxy resin 7 is that it can be formed with no color and cures to an optically clear polymer with the appropriate curing agent. Its broad wavelength transmission enables the epoxy to be used as an optics adhesive or as a protective coating for transmissive or reflective optics. The coupling of microwaves to ionic liquid epoxy resin 7 results in curing at elevated temperatures to produce very strong adhesive bonds, which may be appropriate for aerospace applications and materials. Additionally, optional external pressure applied during the curing step of the present methods serves to further strengthen bonds and cured epoxy structure. In instances where ionic liquid epoxy resin 7 is cured under stress and then allowed to relax after curing, materials may be produced such that they are aligned or have clearance only under load conditions.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

I claim:

1. A method of curing an ionic liquid epoxy mixture, comprising:
   providing an ionic liquid epoxy resin comprising ionic liquid epoxide monomers;
   combining the ionic liquid epoxy resin with a curing agent to form the ionic liquid epoxy mixture;
   depositing a coating of the ionic liquid epoxy mixture onto a first surface of a first material;
   placing the coating in contact with a second surface; and
   applying a microwave signal to the coating, the microwave signal causing ions of the ionic liquid epoxy resin to generate heat such that the ionic liquid epoxide monomers polymerize and the ionic liquid epoxy mixture cures to become a cured epoxy,
   wherein the cured epoxy adheres the first surface to the second surface.

2. The method of claim 1, wherein the ionic liquid epoxide monomers are 1,3-bis(glycidyl)imidazolium trifluoromethanesulfonimide.

3. The method of claim 1, wherein the ionic liquid epoxy resin further comprises diluent epoxy resins.

4. The method of claim 3, wherein the diluent epoxy resins are from the chemical family of Bisphenol-A diglycidyl ethers.

5. The method of claim 3, wherein the ionic liquid epoxide monomers of the ionic liquid epoxy resin are diluted up to 35% by weight with the diluent epoxy resins.

6. The method of claim 1, wherein the curing agent is a diamine or a triamine compound.

7. The method of claim 1, wherein the curing agent is 4,4'-(1,3-Phenylenedioxy) dianiline or m-xylylenediamine.

8. The method of claim 1, wherein the ionic liquid epoxy resin and the curing agent are further combined with a filler to form the ionic liquid epoxy mixture.

9. The method of claim 8, wherein the filler is a powdered glass, ceramic, or polymer filler.

10. The method of claim 1, wherein the ionic liquid epoxy resin and the curing agent are further combined with an accelerator to form the ionic liquid epoxy mixture.

11. The method of claim 10, wherein the accelerator is a thiol compound.

12. The method of claim 1, wherein the first material is a dielectric material.

13. The method of claim 1, wherein the second surface is on the first material.

14. The method of claim 1, wherein the second surface is on a second material.

15. The method of claim 14, wherein the first material and the second material are both dielectric materials.

16. The method of claim 1, wherein the microwave signal produces waves with frequencies ranging from 400 MHz to 10 GHz.

17. The method of claim 1, wherein the microwave signal is applied in a microwave chamber.

18. The method of claim 17, wherein the microwave chamber is configured to enclose the first material, such that the microwave signal is directed to an area within microwave chamber without exiting the microwave chamber.

19. The method of claim 1, wherein a mobile signal generator and electromagnetic radiation source are used to apply the microwave signal.

20. The method of claim 1, wherein volatile organic compounds (VOCs) are not emitted during the curing.

21. The method of claim 1, wherein the microwave signal is applied to the coating for curing the ionic liquid epoxy mixture without applying external heat to the coating.

22. A method of curing an ionic liquid epoxy mixture, comprising:
provide an ionic liquid epoxy resin comprising ionic liquid epoxide monomers;
combining the ionic liquid epoxy resin with a curing agent to form the ionic liquid epoxy mixture;
depositing a coating of the ionic liquid epoxy mixture onto a first surface of a first material;
placing the coating in contact with a second surface; and
applying a microwave signal to the coating within a microwave chamber that is open to the environment, wherein beam microwaves are directed to the coating on the first material without exiting the microwave chamber, and wherein the microwave signal causes ions of the ionic liquid epoxy resin to generate heat such that the ionic liquid epoxide monomers polymerize and the ionic liquid epoxy mixture cures to become a cured epoxy,
wherein the cured epoxy adheres the first surface to the second surface.

23. The method of claim 22, wherein the microwave signal is applied to the coating for curing the ionic liquid epoxy mixture without applying external heat to the coating.

24. A method of curing an ionic liquid epoxy mixture, comprising:
providing an ionic liquid epoxy resin comprising ionic liquid epoxide monomers;
combining the ionic liquid epoxy resin with a curing agent to form the ionic liquid epoxy mixture;
depositing a coating of the ionic liquid epoxy mixture onto a surface of a material; and
applying a microwave signal to the coating, the microwave signal causing ions of the ionic liquid epoxy resin to generate heat such that the ionic liquid epoxide monomers polymerize and the ionic liquid epoxy mixture cures to become a cured epoxy,
wherein the cured epoxy adheres to the surface.

25. The method of claim 24, wherein the cured epoxy forms a protective coating for the surface.

26. The method of claim 24, wherein the microwave signal is applied to the coating for curing the ionic liquid epoxy mixture without applying external heat to the coating.

27. A method of curing an ionic liquid epoxy mixture, comprising:
providing an ionic liquid epoxy resin comprising ionic liquid epoxide monomers;
combining the ionic liquid epoxy resin with a curing agent to form the ionic liquid epoxy mixture;
depositing a coating of the ionic liquid epoxy mixture onto a first surface of a first material;
placing the coating in contact with a second surface; and
applying an electromagnetic signal to the coating, the electromagnetic signal causing ions of the ionic liquid epoxy resin to generate sufficient heat to cause ionic liquid epoxide monomers to polymerize and the ionic liquid epoxy mixture to cure and become a cured epoxy,
wherein the cured epoxy adheres the first surface to the second surface.

* * * * *